Oct. 21, 1952　　　M. A. TAYLOR　　　2,614,838
FOLDING BIRD CAGE FOR ENTERTAINERS
Filed Aug. 17, 1950　　　2 SHEETS—SHEET 1
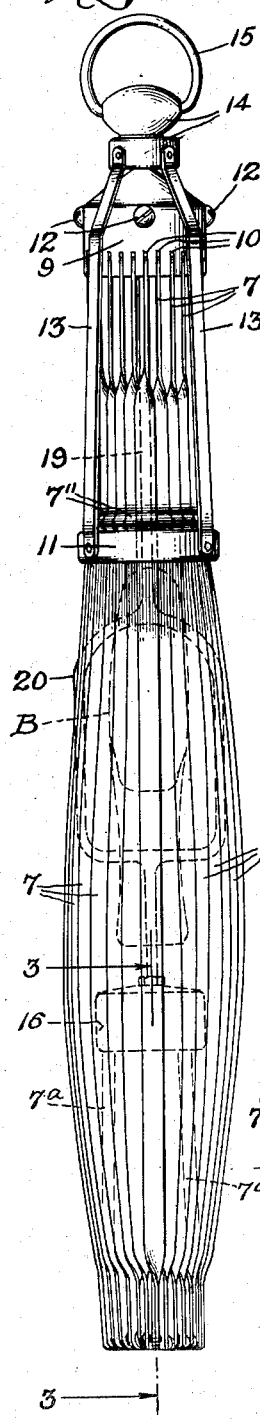
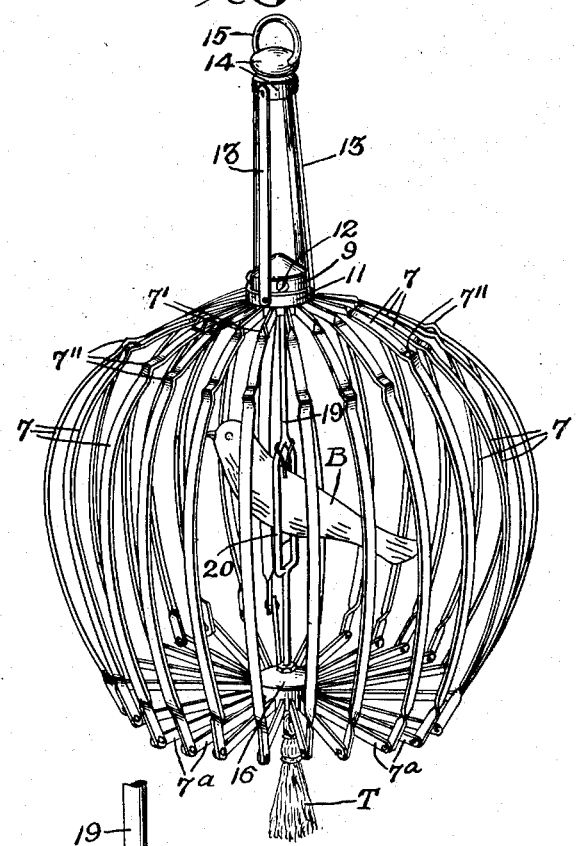
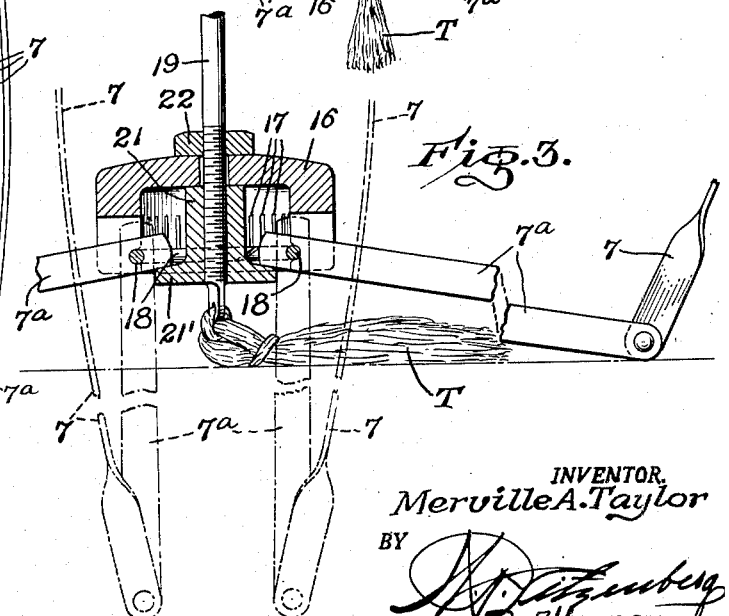
INVENTOR.
Merville A. Taylor
BY
[signature]
Attorney.

Oct. 21, 1952      M. A. TAYLOR      2,614,838
FOLDING BIRD CAGE FOR ENTERTAINERS
Filed Aug. 17, 1950      2 SHEETS—SHEET 2
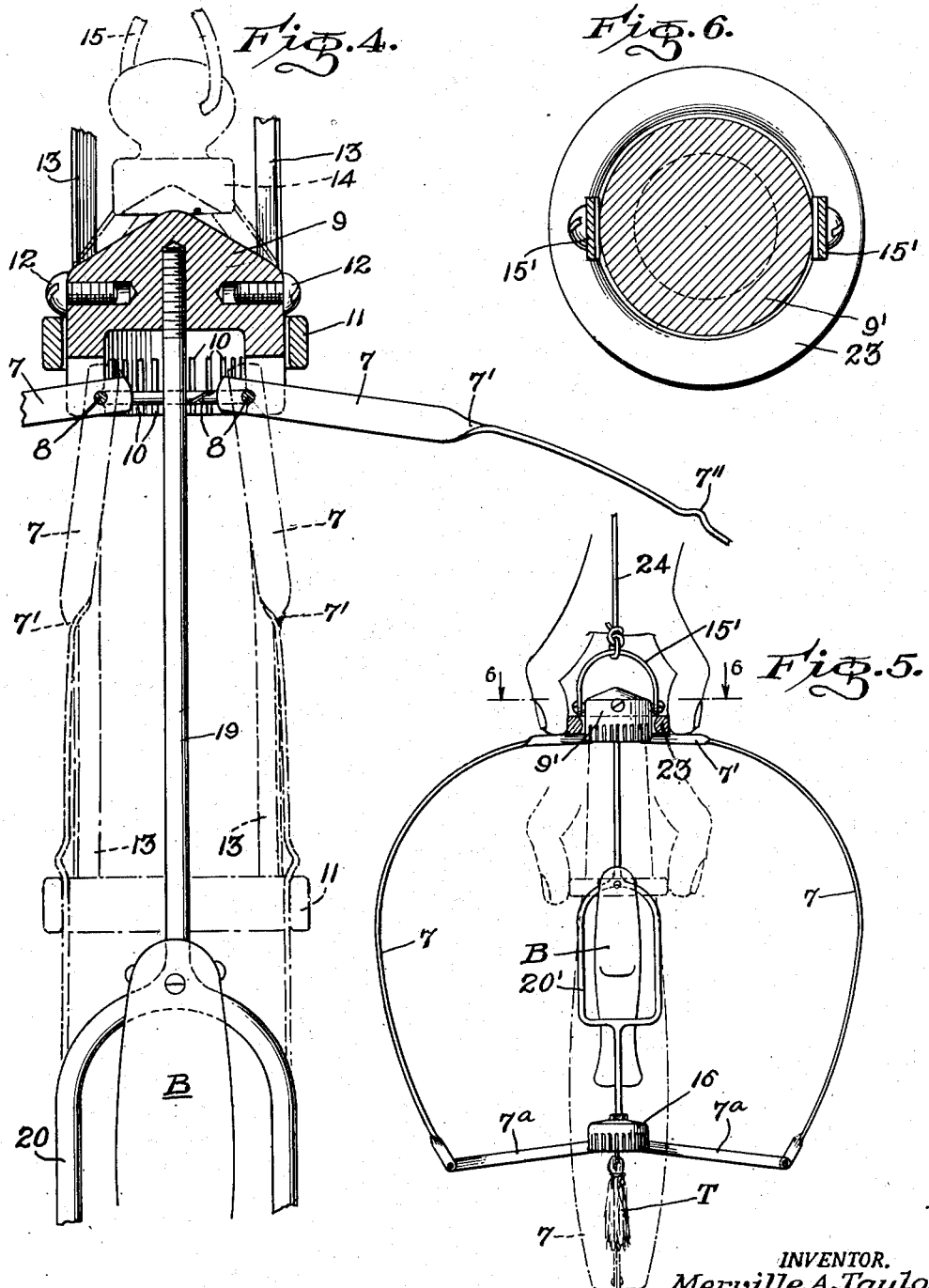
INVENTOR.
Merville A. Taylor Patented Oct. 21, 1952

2,614,838

UNITED STATES PATENT OFFICE 2,614,838

FOLDING BIRD CAGE FOR ENTERTAINERS

Merville A. Taylor, North Hollywood, Calif.

Application August 17, 1950, Serial No. 180,043

7 Claims. (Cl. 272—25)

This invention relates to folding bird cages for entertainers, and it has among its salient objects:

To provide a bird cage having its spaced body members or ribs pivotally connected at their upper and lower ends, whereby they can be compressed together into a compact elongated body of relatively small compass, to be easily hidden up the sleeve of a garment, or easily covered by means of a handkerchief;

To provide a folding bird cage with an artificial or imitation bird on a loop perch therein, said bird and perch being enveloped within the folded cage, or in a normal position when said cage is opened to normal condition;

To provide a folding bird cage having the upper ends of its body members pivotally connected to a top body ring member, and their lower ends joined with short arms pivotally connected to a bottom ring or body member, said short arms folding downwardly;

And, in general, to provide a simple, practical and ornamental folding bird cage which an entertainer or magician can conveniently manipulate with great mystery and which is easily opened from folded condition to its open or normal condition.

In order to explain the invention more in detail, I have illustrated one practical embodiment thereof on the accompanying two sheets of drawings which I will now describe:

Figure 1 is a side elevation of a folded bird cage embodying my invention;

Figure 2 is a side elevation of the same cage distended to its open or normal condition;

Figure 3 is an enlarged sectional detail of the lower end of a cage, taken on line 3—3 of Fig. 1, showing the lower ends of two of the pivoted body members or ribs in open position in full lines, and in folded condition in light broken lines;

Figure 4 is a similar sectional view of the upper end of a folding bird cage, showing two of the body members distended in full lines, and in folded condition in light broken lines, with a loop perch in full lines;

Figure 5 is a fragmentary view showing a slightly modified collapsing ring with a string attached thereto for pulling the cage therethrough for the purpose of collapsing or folding it; and Figure 6 is a cross sectional view taken on the line 6—6 on Fig. 5.

Referring in detail to the drawings, I have shown one practical embodiment of the invention in a round bird cage, shown in open condition in Fig. 2, and in closed or folded condition in Fig. 1.

The body members or ribs, designated 7, 7, are preferably made of spring stainless steel, and are pivotally connected at their upper ends, as at 8, to a head, or ring member 9, having the spaced slots 10 cut in its lower annular edge to receive the upper ends of said body members or ribs 7, 7, as seen in Fig. 4.

A collar 11 is shown around said head 9, in Fig. 4, with screws 12, 12, to prevent said ring from moving upwardly any further than seen in Figs. 2 and 4. Said collar has connected thereto three legs or links, as 13, 13, connected at their upper ends with a head 14, with a ring handle 15 connected therewith as shown, for moving said legs or links 13, and the ring 11, down over the body members 7, 7, to hold them in collapsed condition, as seen in Fig. 1.

Said body members 7, 7, are provided with a twist near their upper ends, as at 7', 7', to put the major portions of said members flatwise around the cage, as illustrated. Said body members 7, 7, are also provided with kinks, as 7", to serve as stops for the ring 11, as seen in Fig. 1, where said ring is shown sprung over said kinks 7". It will be understood that the ring 11 can be forced over said kinks in either direction.

The lower ends of said body ribs 7, 7, are pivotally connected with short arms, as 7ᵃ, pivotally connected at their attached ends to a member 16, having spaced slots 17, 17, cut therein to receive the ends of said short arms 7ᵃ, as shown, and which are held in place therein by means of a split ring 18, Fig. 3.

A perch rod 19 is secured by its upper end in the head 9, as seen in Fig. 4, said rod being provided intermediate its ends with a loop portion, designated 20, with an artificial bird B held therein, as shown. The lower end of said perch rod 19 is extended into the lower member 16 and has screwed thereon a special nut or member 21, having a flaring flange, as 21', which serves as a stop for the inner pivoted ends of the short arms 7ᵃ, as seen in Fig. 3. The outer ends of said short arms 7ᵃ, which are pivotally connected to the lower ends of the body members or ribs 7, as seen in Fig. 3, serve as feet or supports for the cage when it is set upon a table. A lock nut 22 is shown on said perch rod 19, above the member 16, whereby said parts are securely locked to the member 16.

An ornamental tassel T is attached to the lower end of said perch rod 19, to dangle below the cage when it is open, as seen in Fig. 2. When the cage is folded, as in Fig. 1, the short arms 7ª fold downwardly, as indicated in light broken lines in Fig. 3, and as seen in Fig. 1, and said tassel is folded inside of said short arms.

In Fig. 5, I have shown a slightly modified form of collar 11 on the lower ends of the legs or links 13, 13. I have provided a hand ring 23, around the head member 9', with a string 24 attached to the ring 15'. When the ring 23 is grasped between the thumb and fingers, as indicated in Fig. 5, by pulling on the string 24, the cage is drawn through said ring, which collapses it to the same condition indicated in Fig. 1. The loop 20' on the perch rod will serve as a stop when the cage is fully collapsed, as indicated in light broken lines in Fig. 1.

Thus I have provided a simple, practical and effective folding bird cage which can be used by entertainers, or magicians, and so manipulated as to cause great amusement and mystery, and while I have shown but one practical embodiment of the invention, I do not limit the invention to the showing made for explanatory purposes, except as I may be limited by the hereto appended claims.

I claim:

1. A folding bird cage of spherical form including spaced outwardly bulging body ribs, a head member to which the upper ends of said ribs are pivotally connected in closely spaced relationship, a lower member to which the lower ends of said ribs are pivotally connected in closely spaced relationship, a collapsing ring around one end of said body ribs and movable thereon toward the middle thereof to collapse said body ribs together in a compact elongated body.

2. A folding bird cage of spherical form including outwardly bulging body ribs, each rib having a jointed short arm at its lower end, a head member to which the upper ends of said ribs are pivotally connected, a lower member to which the lower ends of said short arms are pivotally connected in closely spaced relationship and adapted to fold downwardly at their joints with said body ribs, a collar around the upper ends of said body ribs and movable downwardly thereon toward the middle thereof to collapse said body ribs together in a compact elongated body, with the lower ends of said body ribs and said short arms folded together below said lower member to envelope the same.

3. A folding bird cage of spherical form consisting of a series of outwardly bulging body ribs pivotally connected at their opposite ends, a head member having spaced slots in which the upper ends of said ribs are pivotally connected, a lower member to which the lower ends of said body ribs are pivotally connected, said body ribs being jointed toward their lower ends, whereby the joints fold downwardly below said lower member and envelope the same as said body ribs are collapsed together, a collapsing ring around the upper ends of said body ribs and movable thereon, lengthwise thereof, to collapse said body ribs together into small compass, and a perch rod for a bird connected at its upper end with said head member and at its lower end to said lower member.

4. A folding cage of spherical form including a head member and a lower member, each having pivot slots cut therein, a series of body ribs having their upper ends pivotally connected in the slots in said head member, and having their lower ends pivotally connected in the slots in said lower member, said body ribs being jointed at their lower ends to provide short arm portions to be folded downwardly around said lower member to envelope it within said ribs, said lower member having a stop to engage the inner ends of said short arms to hold them in extended positions, whereby the joints serve as supports for said bird cage when distended and set down upon a table, and a collapsing ring on the upper ends of said body ribs with means for moving it down over said body ribs to collapse them together into a compact, elongated body.

5. A claim as set forth in claim 4, including a perch rod connected at its opposite ends to said head member and to said lower member, and having a bird holding loop formed intermediate its ends, to be folded within said ribs as said cage is collapsed.

6. A claim as set forth in claim 4 in which said body ribs are provided with kinks in circumferential alinement to serve as holding means for said collapsing ring when sprung thereover in collapsing said body ribs together in folded form.

7. A folding bird cage of spherical form including a head member having pivot slots around its annular edge, a lower member having pivot slots around its annular edge, a series of spring body ribs having their upper ends pivotally connected in said slots in said head member, and having their lower ends pivotally connected in said slots in said lower member, said body ribs being jointed toward their lower ends to provide short arms to form the connections with said lower member, a perch rod having its upper end connected with said head member and its lower end connected with said lower member, said lower member having a stop nut therein on the end of said perch rod to serve as a stop for the inner ends of said pivoted short arms to hold them in extended horizontal positions as a bottom for said bird cage and to permit them to be folded downwardly at their connected ends, with said ribs, and a collapsing ring around the upper end of said ribs to be moved downwardly over said body ribs to collapse them together into a compact, elongated roll.

MERVILLE A. TAYLOR.

REFERENCES CITED

The following references are of record in the file of this patent:

UNITED STATES PATENTS

| Number | Name | Date |
|---|---|---|
| 1,227,814 | Maxwell | May 29, 1917 |
| 1,652,096 | Daviau | Dec. 6, 1927 |
| 2,492,376 | Brillas | Dec. 27, 1949 |